(12) United States Patent
Panikkar et al.

(10) Patent No.: US 11,240,295 B2
(45) Date of Patent: *Feb. 1, 2022

(54) INTELLIGENT SERVICE DISTRIBUTOR AND CONTROLLER WITH REAL TIME SERVICE CALIBRATION

(71) Applicant: EMC IP Holding Company LLC, Hopkinton, MA (US)

(72) Inventors: Shibi Panikkar, Bangalore (IN); Murali Devendranath, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/582,235

(22) Filed: Sep. 25, 2019

(65) Prior Publication Data

US 2020/0021644 A1    Jan. 16, 2020

Related U.S. Application Data

(63) Continuation of application No. 16/026,608, filed on Jul. 3, 2018, now Pat. No. 10,491,668.

(51) Int. Cl.
*H04L 29/08* (2006.01)
*G06F 9/50* (2006.01)
*G06F 11/34* (2006.01)

(52) U.S. Cl.
CPC .......... *H04L 67/1008* (2013.01); *G06F 9/505* (2013.01); *G06F 9/5083* (2013.01); *G06F 11/3419* (2013.01); *G06F 11/3433* (2013.01); *H04L 67/1012* (2013.01); *H04L 67/1023* (2013.01)

(58) Field of Classification Search
CPC ............ H04L 67/1008; H04L 67/1012; H04L 67/1023; H04L 43/0858; G06F 9/505; G06F 9/5083; G06F 11/3419; G06F 11/3433; G06F 9/5066; G06F 2209/5017
See application file for complete search history.

(56) References Cited

U.S. PATENT DOCUMENTS

| 2006/0029016 A1* | 2/2006 | Peles ........................ H04L 69/16 370/328 |
| 2007/0094662 A1* | 4/2007 | Berstis ..................... G06F 9/505 718/102 |
| 2011/0041136 A1* | 2/2011 | Messier ................. G06F 9/5066 718/105 |

(Continued)

OTHER PUBLICATIONS

U.S. Appl. No. 16/026,608, filed Jul. 3, 2018, Panikkar et al.

(Continued)

*Primary Examiner* — Muhammad Raza
(74) *Attorney, Agent, or Firm* — Daly Crowley Mofford & Durkee, LLP (57) ABSTRACT

Described embodiments provide real time load balancing and calibration processes. An aspect includes receiving a request to execute a service, assessing capacity of a target server to execute the service, and setting a threshold for a number of services to be executed on the target server. A further aspect includes assigning a unique identifier of the service to the target server, and based on the threshold and an assessment of a capability of other servers, assigning the service to the server.

6 Claims, 8 Drawing Sheets

(56) References Cited

U.S. PATENT DOCUMENTS

| | | | | |
|---|---|---|---|---|
| 2015/0169380 A1* | 6/2015 | Inoue | ................ | G06F 9/3885 |
| | | | | 718/105 |
| 2016/0140012 A1* | 5/2016 | Hsu | ................ | H04L 67/1029 |
| | | | | 702/186 |
| 2016/0164957 A1* | 6/2016 | Leemet | ................ | G06Q 30/04 |
| | | | | 709/203 |
| 2016/0179865 A1* | 6/2016 | Bortnikov | ................ | G06F 16/2343 |
| | | | | 707/704 |
| 2016/0247178 A1* | 8/2016 | Gujar | ................ | H04L 41/5003 |
| 2017/0123850 A1* | 5/2017 | Nakazawa | ................ | G06F 9/4881 |
| 2017/0180469 A1* | 6/2017 | Ford | ................ | H04L 67/1008 |
| 2018/0309686 A1* | 10/2018 | Roth | ................ | H04L 43/16 |

OTHER PUBLICATIONS

Anderson et al., "High-Performance Task Distribution for Volunteer Computing;" Proceedings of the First International Conference on e-Science and Grid Computing (e-Science '05); Jul. 5, 2005; 8 Pages.

Farkas et al., "Interoperability of BOINC and EGEE;" Future Generation Computer Systems, vol. 26, Issue 8; Oct. 2010; pp. 1092-1103; 12 Pages.

Gonzalez et al., "Centralized BOINC Resources Manager for Institutional Networks;" 2008 IEEE International Symposium on Parallel and Distributed Processing; Apr. 14, 2008; 8 Pages.

Posypkin et al., "Using BOINC Desktop Grid to Solve Large Scale SAT Problems;" Computer Science, vol. 13, No. 1; Jan. 2012; 10 Pages.

U.S. Notice of Allowance dated Aug. 21, 2019 for U.S. Appl. No. 16/026,608; 20 Pages.

\* cited by examiner

| Service Onboard (j) | Threads(t) | Response Time (Sec)t1 | Expected Response Time(Sec)t2 | Variation % (V) | CPU Usage (%) | Free RAM (Mb) |
|---|---|---|---|---|---|---|
| 1 | 1 | 3 | | | | 15 |
| 10 | 1 | 28 | 30 | 3.3333333333 | 50.3 | 14.3 |
| 100 | 1 | 2987 | 3000 | 0.216666667 | 51.1 | 14.1 |
| 1000 | 1 | 28768 | 30000 | 2.0533333333 | 51.2 | 14.2 |
| 1000 | 2 | 16309 | 15000 | 4.3633333333 | 50.9 | 10.2 |
| 1000 | 3 | 10347 | 10000 | 1.735 | 58.2 | 8.32 |
| 1000 | 4 | 8456 | 7500 | 6.3733333333 | 60.6 | 7.43 |
| 1000 | 5 | 5467 | 3000 | 41.11666667 | 62.45 | 7.02 |
| 1000 | 6 | 4343 | 1666.66667 | 80.29 | 64.43 | 6.56 |

Target to complete 1000 Prepare Entitlement Services

Pseudo Code

Let j1 be number of jobs to planning, and cut off time to execute is "t" hours

Give Single Job in Single thread (j). Thread d=1;
Record "Response time (t1), CPU, RAM
If no CPU, RAM issue,
Loop (j=j+10 while j<j1)
Expected Response Time t2 = t1*j;
Variation v %= 100- (((t2+t1)/2*t2)*100)
If (v% > 40&& no RAM or CPU Issue)
Break loop;
Loop End
On Exit: Result j= Jobs
Now increase thread using jobs j
Loop
Thread d=d+1;
Execute job
Excepte Résponse Time t2 = t1*j/d;
Variation v% = 100- (((t2+t1)/2*t2)*100)
If (v% > 40 && no RAM or CPU Issue or t1 < t)
Break loop;
Else Exit
Optimal Jobs = j and Threads are d;

INTELLIGENT SERVICE DISTRIBUTOR AND CONTROLLER WITH REAL TIME SERVICE CALIBRATION

BACKGROUND

Today's software industry faces challenges in intelligently distributing work to different servers and the services that reside within them. Some of these challenges include a lack of insight of the actual amount of work to be performed, effective resource utilization, concurrency without duplication of work, abnormally high response times, and potential malfunctioning of the service due to CPU overshoot of RAM deficiency or middle tier data store waiting. Current load balancer operations are designed based on the number of incoming requests, a weighted percentage, or a least used algorithm.

In addition, though performance testing methods exist to assess the capability of servers to perform particular services, these are typically done in a non-production environment before getting into production mode. However, it can be challenging to match the performance testing environment to the production environment. For instance, the data that a service is dealing with may not match the production data resulting in unpredictability. Re-calibration of the production servers "on-the-fly" presents a further challenge.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for providing real time load balancing and calibration processes. The method includes receiving a request to execute a service, assessing capacity of a target server to execute the service, and setting a threshold for a number of services to be executed on the target server. The method further includes assigning a unique identifier of the service to the target server and, based on the threshold and an assessment of a capability of other servers, assigning the service to the server.

Another aspect may provide a system including a memory having computer-executable instructions and a processor executing the computer-executable instructions. The computer-executable instructions when executed by the processor cause the processor to perform operations. The operations include receiving a request to execute a service, assessing capacity of a target server to execute the service, and setting a threshold for a number of services to be executed on the target server. Operations further include assigning a unique identifier of the service to the target server and, based on the threshold and an assessment of a capability of other servers, assigning the service to the server.

Another aspect may provide a computer program product embodied on a non-transitory computer readable medium, the computer program product including instructions that, when executed by a computer, causes the computer to perform operations. The operations include receiving a request to execute a service, assessing capacity of a target server to execute the service, and setting a threshold for a number of services to be executed on the target server. Operations further include assigning a unique identifier of the service to the target server and, based on the threshold and an assessment of a capability of other servers, assigning the service to the server.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

In current software industry applications, the same services are typically used in multiple servers or it may be that the service itself will have multiple threads. One industry approach involves directly accessing requests by different services in different servers and executing the corresponding work. This can lead to concurrency issues in the data store, which can lead to processing of the same request by different services, as well as to duplication. In another approach, the distribution of the work to different servers is done by the load balancers, which use techniques such as round robin, weighed percentage, least used network, priority, lowest latency, or persistent session. In either approach, this can cause considerable consumption of resources, particularly in high traffic situations. For example, the load balancer in these approaches may not assess the type of job, the service in the server that is subject to process, or the capability of the service/server to execute per hour or per day without breaking the system. Further, in these approaches, the work may not be distributed to avoid concurrent requests, which can lead to duplication of the data processing in the data store.

In accordance with embodiments, real time load balancing and calibration processes are provided. The techniques described herein provide an intelligent service distributor and controller. The intelligent service distributor and controller assesses the capacity of a server and its capability to execute a service in a single- or multi-threaded and multi-processing way against the nature and load of the service that is subject to execute. The intelligent service distributor and controller also assigns the optimal number of jobs to the service by avoiding concurrency issues and waits, and accurately predicts service completion in middle tier to data store.

Figure 1:
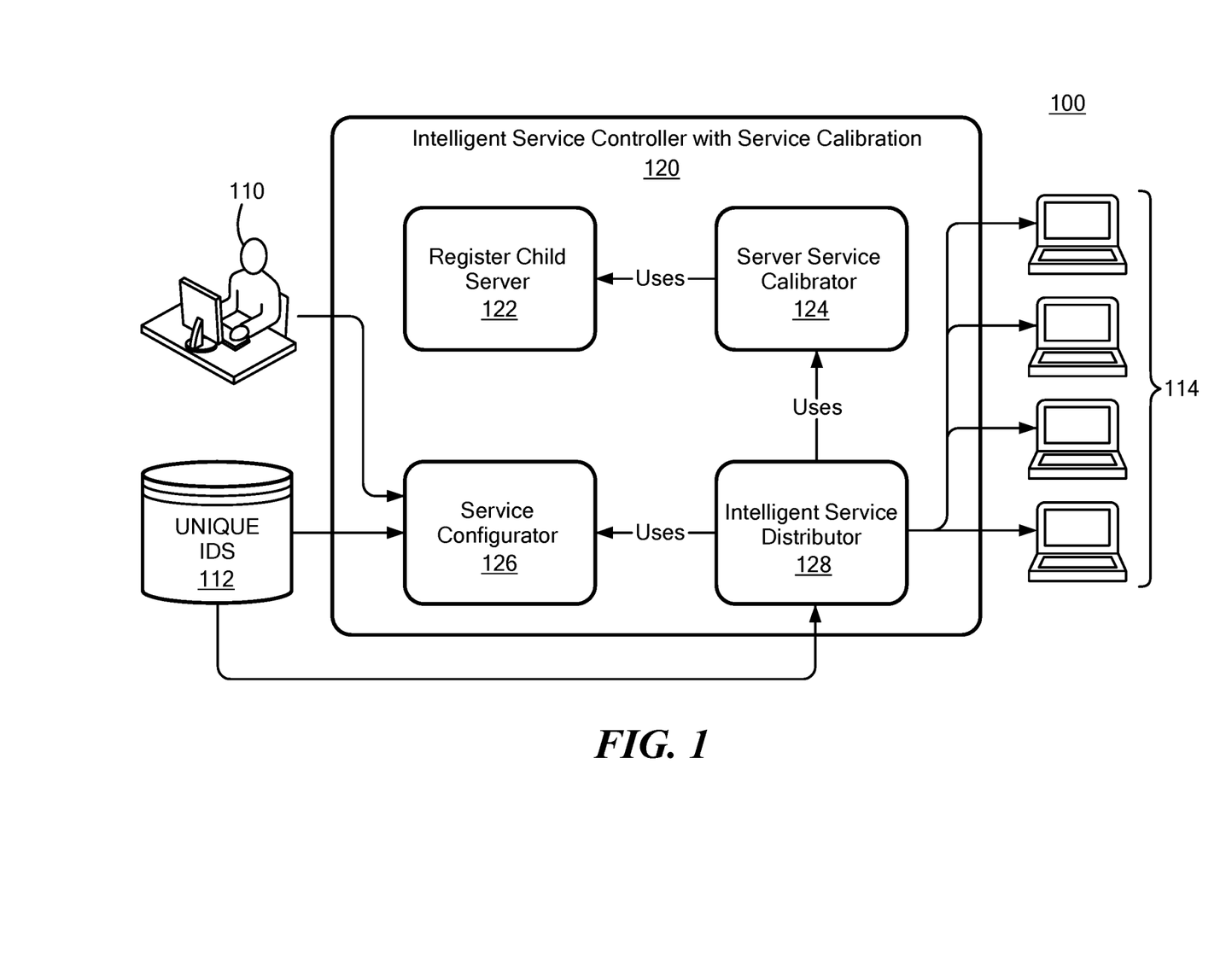
FIG. 1 is a block diagram of a portion of a system upon which real time load balancing and calibration processes may be implemented in accordance with an embodiment.

Turning now to FIG. 1, a portion of a system 100 for implementing real time load balancing and calibration processes will now be described according to embodiments. As shown in FIG. 1, an intelligent service distributor and controller 120 is communicatively coupled to an external system 110, a data storage device 112, and a plurality of child servers, which are collectively referred to herein as child servers 114.

External system 110 provides service requests to the intelligent service distributor and controller 120. The external system 110 may be implemented as a general-purpose desktop or laptop computer. An end user may access a user interface (not shown) of the external system 110 via a web browser operating on the external system 110. It will be understood that the exemplary processes may be implemented via other devices, such as a wireless communication device (e.g., a smart phone, personal digital assistant, or tablet PC).

Data storage device 112 stores unique identifiers (IDs) for each of the different servers. Data storage device 112 may be implemented as various types of storage systems. For example, the storage device 112 may include one or more rotating magnetic storage devices, one or more rotating optical storage devices, and/or one or more solid state drives (SSDs), such as a flash drive. For example, the storage device 112 may include one or more hard disk drives (HDD), one or more flash drives, optical disks, as well as one or more other types of data storage devices.

Child servers 114 receive and execute work assignments from the intelligent service distributor and controller 120. Child servers 114 may be implemented by one or more high-speed computer processing devices, such as one or more mainframe computers, and/or may include one or more general purpose computers.

In embodiments, the intelligent service distributor and controller 120 may be implemented as a component of the external system 110 or other computer device (not shown), and may be implemented in hardware, software, or a combination of the two. In embodiments, the intelligent service distributor and controller 120 includes a registration module 122, a service calibrator module 124, a service configurator module 126, and a service distributor module 128.

In embodiments, the registration module 122 is configured to register with new child servers, such as servers 114, having the same services to be run in parallel. The service calibrator module 124 calibrates server in real time to execute a particular job or chain of jobs in parallel threads. The service calibrator module 124 also calibrates the child server for a particular service or chain of service (e.g., number of job services=j, and a parallel thread can be enabled in it=t).

The service configurator module 126 configures the dependency of the jobs that need to be executed with the unique ID of the service. The service distributor module 128 is responsible for getting the unique work from the incoming requests with assessment of dependency of the services, capacity of the child server, and redistributing work from other child servers to ensure the work is completed within the time anticipated with the help of the service configurator module 126.

Figure 2:
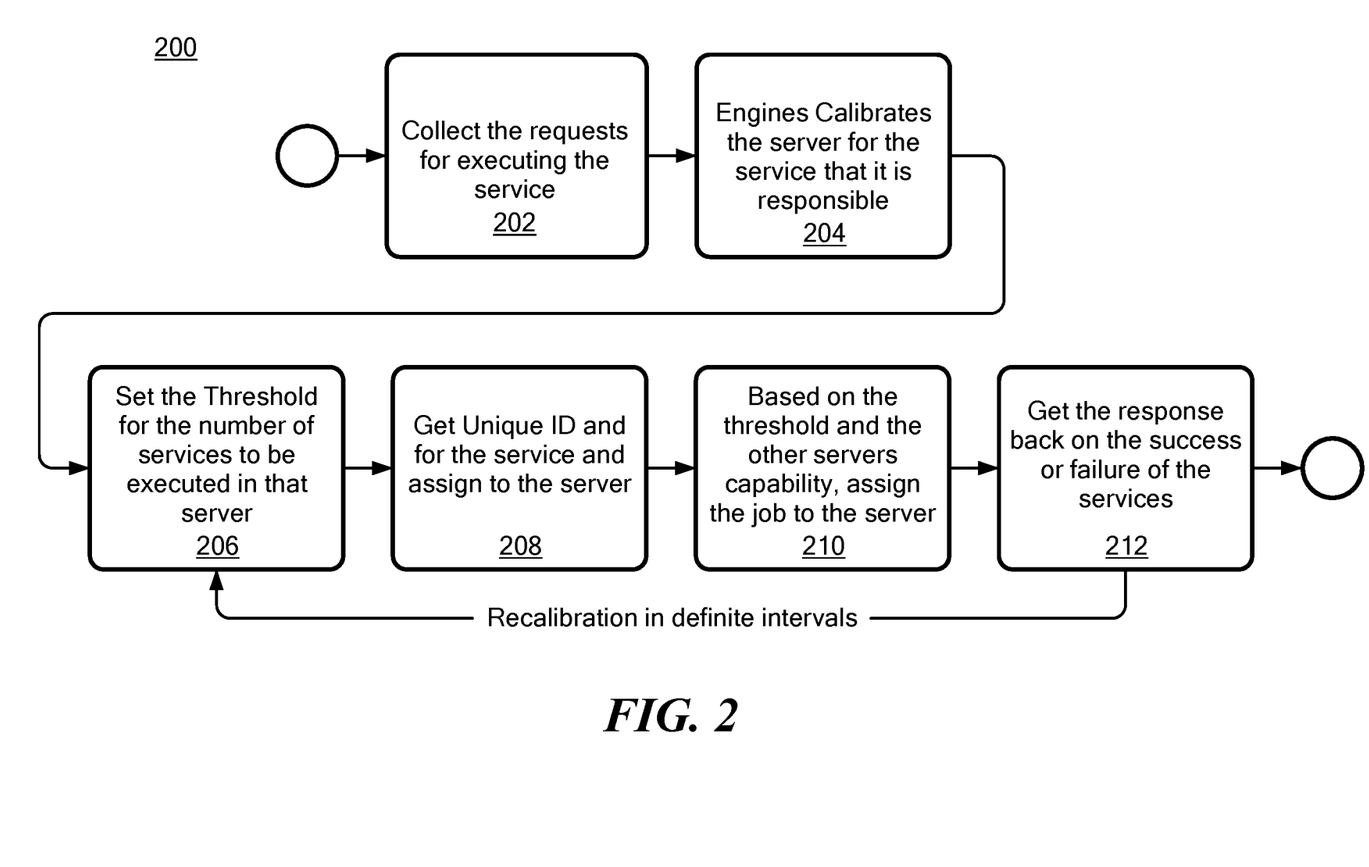
FIG. 2 is a flow diagram of a process for performing real time load balancing and calibration processes in accordance with an embodiment.

Turning now to FIG. 2, a flow diagram of a process 200 for implementing real time load balancing and calibration processes using the intelligent service distributor and controller 120 will now be described. The intelligent service distributor and controller 120 manages incoming requests for services from external systems 110. At block 202, the service configurator module 126 receives service requests from the external systems 110.

In block 204, module 124 of the intelligent service distributor and controller 120 assess the child server capacity by calibrating the server with a particular service with parallel threads in optimal time. For example, the calibrating will avoid overshooting the CPU or excessive consumption of RAM. The server is calibrated for the service that it is responsible for. These processes will be described further herein with respect to FIGS. 4-7.

In block 206, the maximum number of services and threads to assign to a particular server is set by module 126. In other words, a threshold number of services to be executed on a particular server is set. In block 208, the unique services to be executed on different servers and threads in a service are obtained with the proper unique ID (e.g., unique primary keys) by module 128. The intelligent service distributor and controller 120 handles the dependent jobs to be performed in sequence.

Based on the threshold number and the capabilities of the other servers, the job request is assigned to the server in block 210 by the service distributor module 128. This step includes identifying how many services can optimally execute in the different servers and how many services are to be executed.

In block 212, a response is received by module 128 indicating whether the services were successful or not. As shown in FIG. 1, the flow of information among the elements indicates that the modules will use the data received from other respective modules to perform some task. For example, module 124 will be performing calibration though it will not know which of the child servers it needs to perform the calibration for. Module 124 will communicate with module 122 to obtain the child server and module 128 assigns the job to the child server for calibration. Re-calibration in specified intervals can be performed as indicated by the arrow between blocks 212 and 206.

Figure 3:
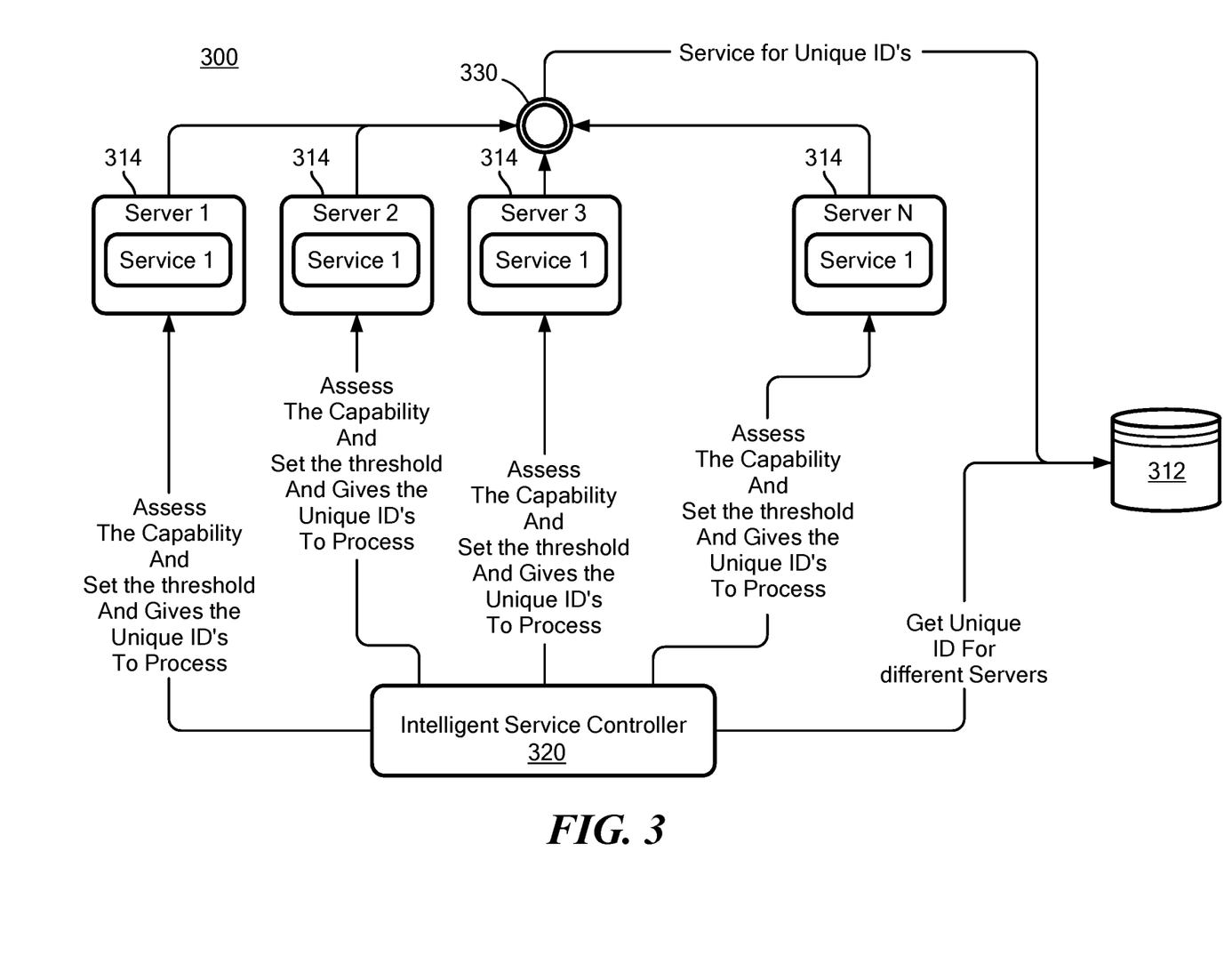
FIG. 3 is block diagram of a component architecture for implementing real time load balancing and calibration processes in accordance with an embodiment.

Turning now to FIG. 3, a component architecture 300 for implementing real time load balancing and calibration processes in accordance with an embodiment. The architecture 300 of FIG. 3 represents a digital fulfillment embodiment and includes the intelligent service distributor and controller 320, child servers 314, and data storage device 312. The intelligent service distributor and controller 120, child servers 314 and data storage device 312 may be the same as those described in FIG. 1.

As shown in FIG. 3, the intelligent service distributor and controller 320 obtains the unique ID for each of the different servers (servers 1-N). For each child server 314 (servers 1-N), the intelligent service distributor and controller 320 assesses the capability of the server, sets the threshold for the number of services for execution in the server, and provides the unique ID to process. Element 330 represents part of module 128, in which all unique service IDs are obtained. The module then determines which unique ID to be given to which child server. Once the servers 314 have been processed via the intelligent service distributor and controller 320, the servers may execute the corresponding services.

One practical challenge in the Digital Fulfillment is, whichever load balancer is kept, the load balancer does not intelligently give the work that the server can execute within its hardware limitations with parallel processes. Performance testing in a testing environment assesses the maximum threads and the amount of work that a service in the server can process. But in production, the hardware, other resources in the server, and the data varies, and the work coming in to be serviced can be greater than expected. In addition, the work that the server performs is not always subject to the same conditions. For example, there can be increases in the server resource utilization, database waits, etc., which can lead to failure of the service to be completed.

Calibrating the service in a server with production data where optimal parallel processes can be enabled would provide limitations to the work that can be given to the server. Existing techniques have not provided calibration. A technique to calibrate the child server and assess the optimal capacity of the server for the pre-defined single service or chain of services in production, in real time, is provided. Thus, the work can be allocated according to this number in congestion with the other child servers executing the same service or chain of services.

Figure 4:
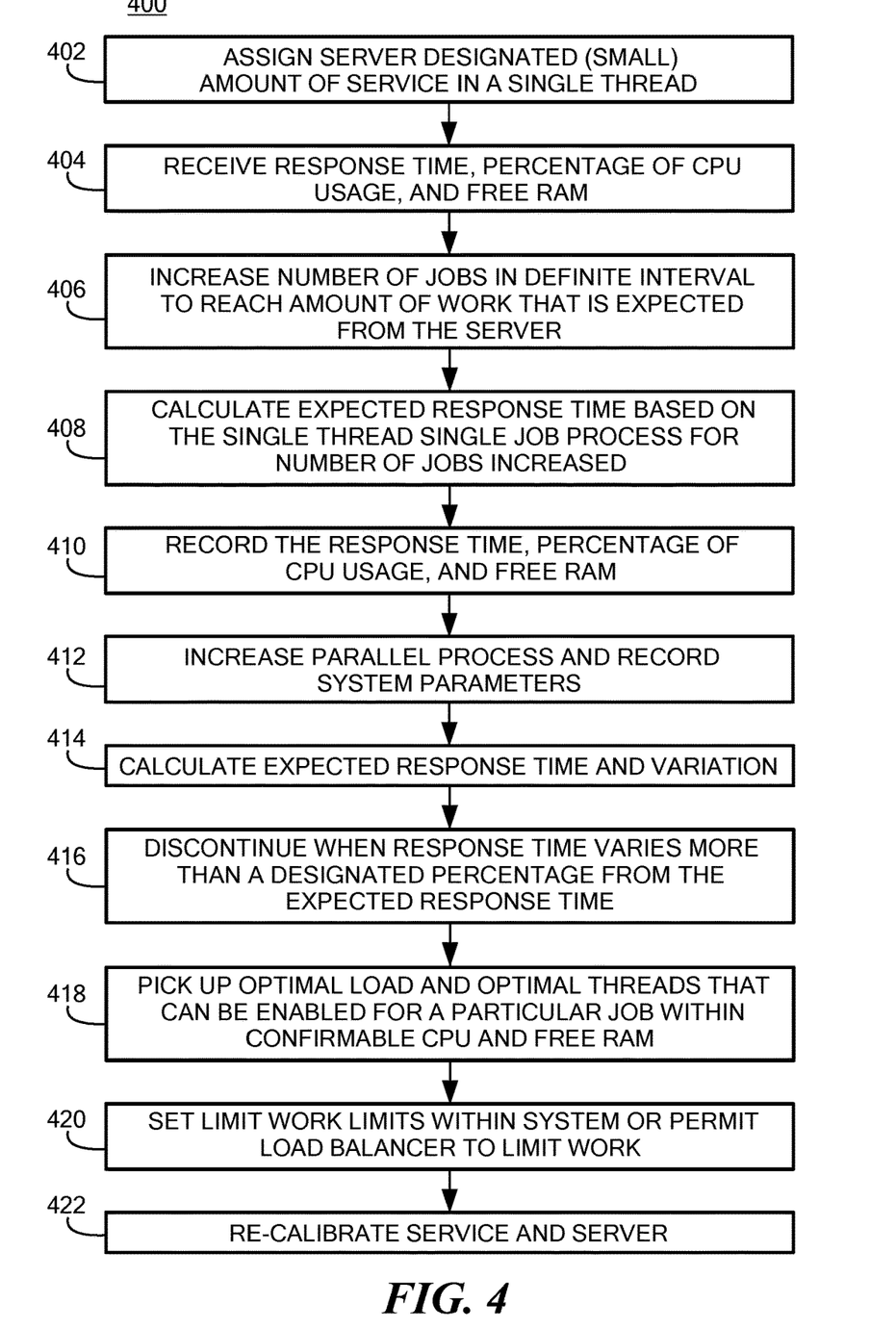
FIG. 4 is a flow diagram of a process for real-time calibration of a server and assessment of the optimal capacity of the server for a service or chain of services in production, in accordance with an embodiment.

FIG. 4 is a flow diagram of a process 400 for real-time calibration of a child server and assessing the optimal capacity of the server for a service or chain of services in production. The process 400 of FIG. 4 may be performed by the service calibrator module 124 of FIG. 1.

In block 402, a designated amount of a service is assigned to a server in a single thread (e.g., a single job). Thus, instead of assigning an entire service to a server, a small portion of the service is assigned. In block 404, a response time, percentage of CPU usage, and free RAM is received by module 128 from the child servers and updates are provided between modules 128 and 126. In block 406, the number of jobs is increased in definite intervals to reach the amount of work that is expected from the server sequentially. This interval can be a configurable parameter. In block 408, the expected response time is calculated based on the single thread single job process for the number of jobs increased (e.g., linear–single job single thread response time*number of jobs).

In block 410 the response time, percentage of CPU usage, and free RAM is recorded (e.g., in the data storage device 112 of FIG. 1). These increments may be discontinued in case the CPU utilization is more than the hardware limitations discovered (e.g., 80% or free RAM reduces to below 1024b). In block 412, the parallel processes are increased (e.g., increase threads to 2, 3, ... etc.) and the above system parameters are recorded (e.g., in the data storage device 112 of FIG. 1). In block 414, the expected response time is calculated (e.g., single job single thread response time*number of jobs/number of threads) and variation % (expected response time–actual response time/expected response time)*100.

In embodiments, the increase in parallel processes are discontinued when the response time varies more than 40-50% than the expected response time in block 416. That number of threads is then set as the threshold for that child server as part of the online calibration. In block 418, the optimal load and optimal threads (e.g., number of parallel processes) that can be enabled for the particular job are picked up, i.e., many jobs may be passed to the respective child servers, within the confirmable CPU and free RAM. Variations can be due to, by non-limiting examples, the current resource limitations in the middle tier or waits in the database. In block 420, limits within the system are set or the load balancer may be permitted to limit the work (e.g., the load balancer is able to give a specified or limited amount of work) In block 422, the service and the server are re-calibrated at specified intervals. In module 124 there may be a self-ending loop that is timer based. This starts the calibration and uses module 122 to get the child servers and also utilizes module 128 to execute the jobs one by one (e.g., linear and parallel) and set the threshold in module 122 against each child server. Module 128 in turn uses the information to assign the correct jobs.

Figure 5:
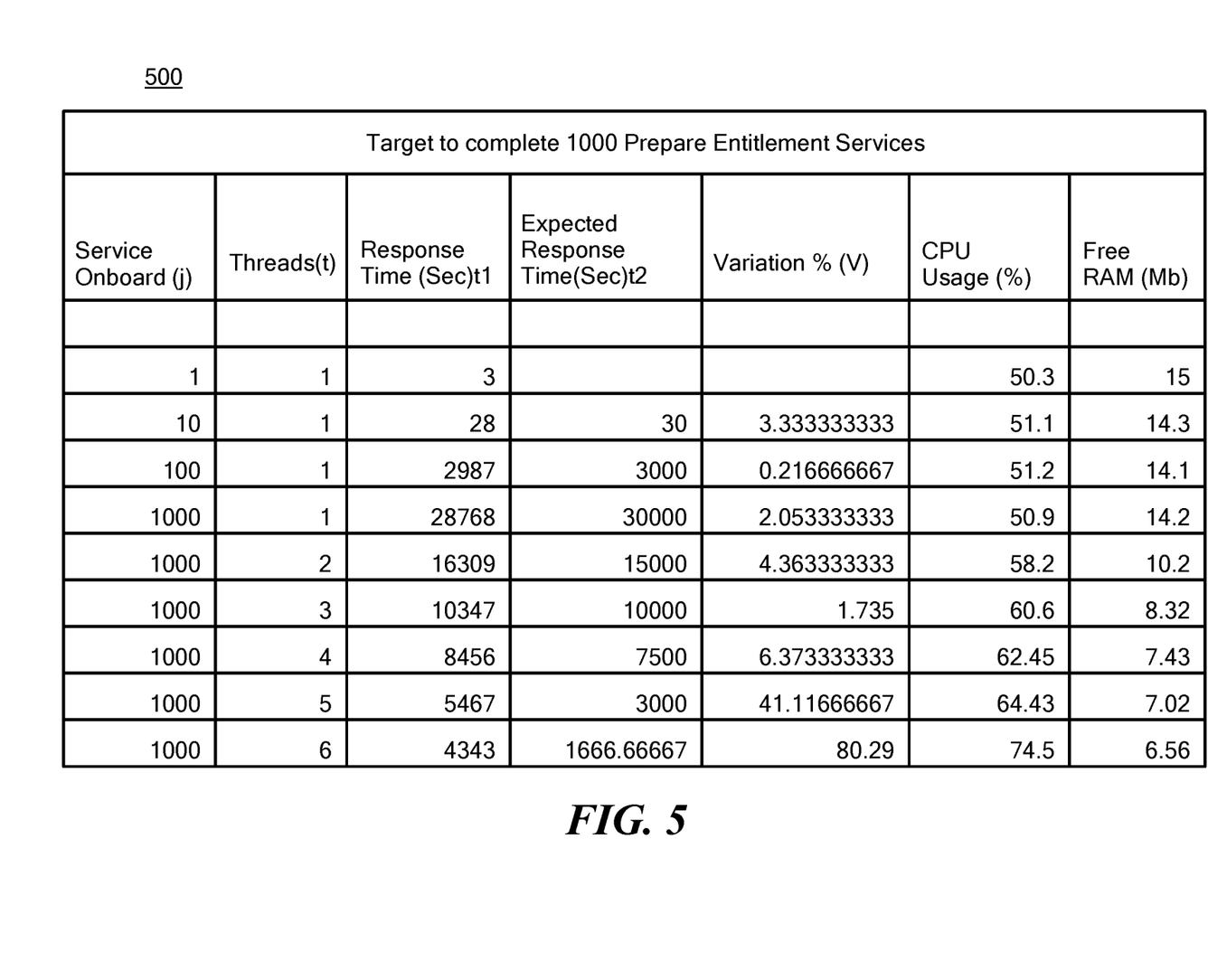
FIG. 5 is a table depicting production operation data for a prepare entitlement service in accordance with an embodiment.

In Digital Fulfillment there is a service called Prepare Entitlement. Once the entitlement request is received, this service collects all attributes required to create entitlement from other systems (e.g., PIM, PDSL, Agile, etc.) to create the entitlement. As this service can be an important and heavy load service, failures due to overload are not uncommon. Production operations have been assessed and sampled data is shown in FIG. 5. The data shown in FIG. 5 is from a performance environment under testing.

In the table 500 shown in FIG. 5, the goal is set to execute 1,000 jobs in service, which are capable of being finished in approximately three hours' time. It is first determined whether the 1,000 jobs can be run sequentially. A first job is started with one thread and the response time for this job is determined. The jobs are then increased until they reach 1,000.

Let the number of jobs=j
Threads=t
Actual response time=t1
Expected response time=t2

$$\text{Expected response time} = (\text{response time for a single job and single thread} \ast \text{number of jobs})/\text{number of threads (i.e., } t2 = t1 \ast j/t)$$

$$\text{Percentage variation} = 100 - (((t2+1)/2 \ast t2) \ast 100).$$

This is the variation of the actual response with respect to the expected time. When this variation is more than 40%, then the thread is no longer increased (in this calibration, one thread is tooled and took 6 threads as there were no issues with the CPU or RAM, but there were some middle tier or database waits). Also, the time taken is 4343 Secs=1.2 hours, which well below the three hour requirement.

Here the system can pick up the safest (e.g., optimal) thread as four, because the expected and the actual response time variation is not that significant. Moreover, the response time is well below the three hours. If five or six threads were selected, though the response time is low, the variation between the actual and expected time becomes very high, which indicates that there are some waits or resource congestion happening from thread five. Therefore, the safest selection is thread four and the number of jobs set to 1,000.

Figure 6:
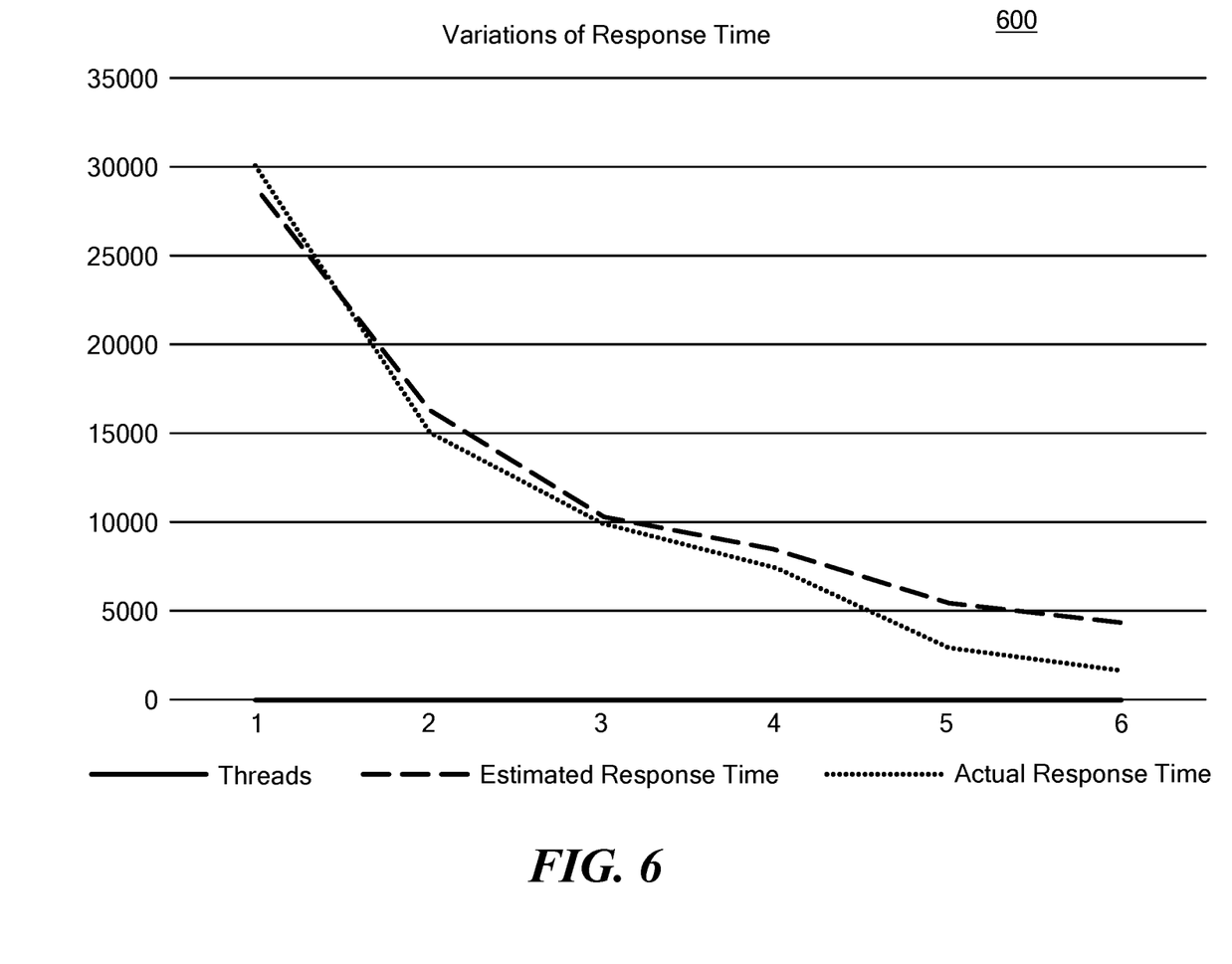
FIG. 6 is a graph depicting variations between response times as a function of the number of threads and jobs in accordance with an embodiment.

Turning now to FIG. 6, a chart 600 depicting variations in response time based on the number of threads and estimated versus actual response times. Here, the Y axis is the "Response time" and the X Axis is the number of threads (i.e., for same type of job to be executed 1000 times). From FIG. 5, it is shown with the single thread when reaching up to 1000 jobs the "Actual Time" is less than the "Estimated Time." Estimated time is predetermined that within what time the job should executed. But though the single thread execution gives the good response time that is not optimal. Therefore, the thread is increased and see when the 40-50% variation comes with the estimated time. Here it is 5 threads. The CPU is 64% which is within an acceptable range. Thus, the optimal threads for this will be 5 threads and the max jobs for this server is 1000. This means that the threshold value that setting in module 122 will be 1000 jobs in 5 threads. Module 128 will use this information while executing.

Figure 7:
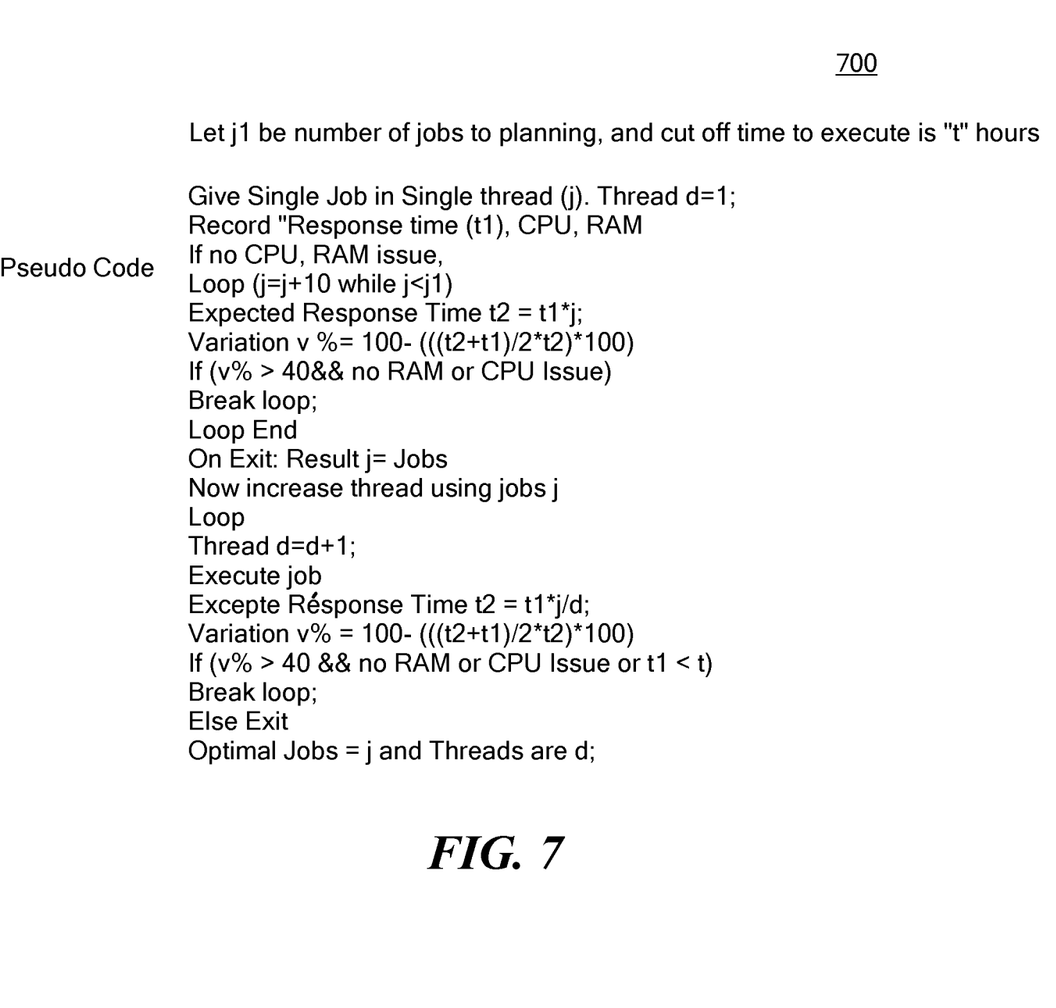
FIG. 7 depicts sample pseudo code that can be utilized in implementing the logic for the real time calibration processes in accordance with an embodiment.

FIG. 6 illustrates the optimal load and thread count that can be processed by a service in the server as 1,000 with the thread count of six. This information can be used by the process to set the threshold within the server or can be used in Telligent load balancers to control the incoming requests to the server. The logic can be automated using a computer program to give the result and set the appropriate thread and jobs that can be executed. Sample logic 700 is shown in FIG. 7.

The above described intelligent load balancing processes can be used to assist the IT industry in assessing server capability to service a request end to end. It can be Internet requests, a service that is running on a server, web services, etc. The calibration of the server for a particular service can be executed in parallel. Once calibrated, these values can be used in the server itself for throttling or external customized load balancers to distribute the work to the server, which is done in production mode in real time.

Figure 8:
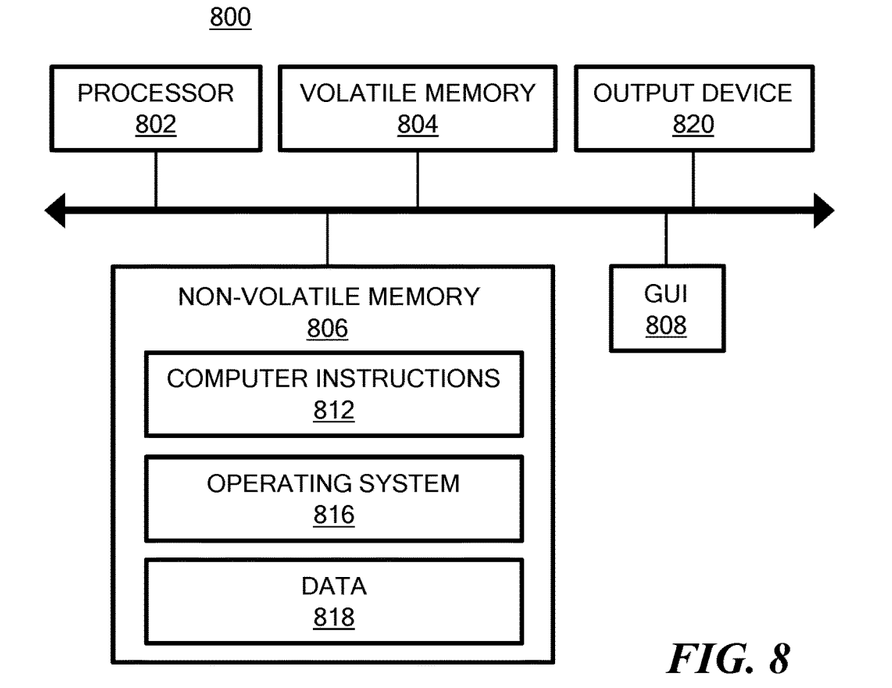
FIG. 8 is a block diagram of a hardware device that may perform the real time load balancing and calibration processes in accordance with an embodiment.

Referring to FIG. 8, a computer 800 may include processor 802, volatile memory 804 (e.g., RAM), non-volatile memory 806 (e.g., a hard disk drive, solid state drive such as a flash drive, a hybrid magnetic and solid state drive, etc.), graphical user interface (GUI) 808 (e.g., a mouse, a keyboard, a display, and so forth) and input/output (I/O) device (not shown). Non-volatile memory 806 stores computer instructions 812, an operating system 816 and data 818 such that, for example, the computer instructions 812 are executed by the processor 802 out of volatile memory 804 to perform at least a portion of the processes 200 shown in FIGS. 2 and 400 shown in FIG. 4. Program code may be applied to data entered using an input device of GUI 808 or received from the I/O device.

Processes 200 shown in FIGS. 2 and 400 shown in FIG. 4 are not limited to use with the hardware and software of FIG. 8 and may find applicability in any computing or processing environment and with any type of machine or set of machines that is capable of running a computer program. Processes 200 and 400 may be implemented in hardware, software, or a combination of the two.

The processes described herein are not limited to the specific embodiments described. For example, processes 200 and 400 are not limited to the specific processing order shown in respective FIGS. 2 and 4. Rather, any of the blocks of processes 200 and 400 may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIGS. 2 and 4, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 9:
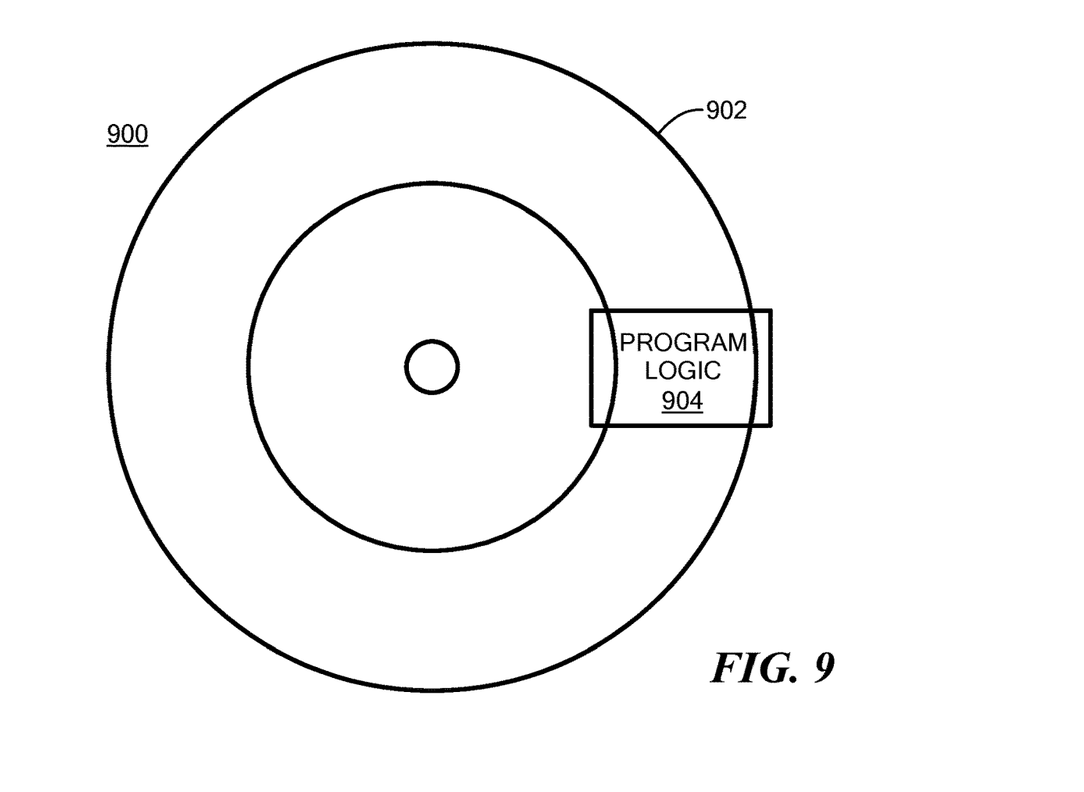
FIG. 9 is a simplified block diagram of an apparatus that may be used to implement at least a portion of the systems of FIGS. 1, 3, and 8 and at least a portion of the processes of FIGS. 2 and 4 in accordance with an embodiment.

For example, when the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 9 shows Program Logic 904 embodied on a computer-readable medium 902 as shown, and wherein the Logic is encoded in computer-executable code configured for carrying out the reservation service process of this invention and thereby forming a Computer Program Product 900. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for providing real-time load balancing and calibration processes comprising:
   receiving, by a hardware processor, a request to execute a service;
   assessing, by the hardware processor, capacity of a target server to execute the service;
   setting, by the hardware processor, a threshold for a number of services to be executed on the target server;
   assigning, by the hardware processor, a unique identifier of the service to the target server;
   assessing, by the hardware processor, capability of other servers, and responsive to the assessment of the capability of the other servers, redistributing work among the other servers as a function of a target time of completion for work running on the servers; and
   based on the threshold and the assessment of the capability of the other servers, assigning, by the hardware processor, the service to the target server,
   wherein assessing the capacity of the target server includes calibrating the target server by-subjecting the target server to a load of parallel threads and detecting central processing unit (CPU) consumption and random access memory (RAM) consumption that result from the load,
   wherein the threshold includes a maximum number of services and threads to be assigned.

2. The method of claim 1, further comprising registering servers having the same services to be run in parallel.

3. A system for providing real-time load balancing and calibration processes, comprising:
- a hardware memory comprising computer-executable instructions; and
- a hardware processor executing the computer-executable instructions, the computer-executable instructions when executed by the hardware processor cause the hardware processor to perform operations comprising:
- receiving a request to execute a service;
- assessing capacity of a target server to execute the service;
- setting a threshold for a number of services to be executed on the target server;
- assigning a unique identifier of the service to the target server;
- assessing capability of other servers, and responsive to the assessment of the capability of the other servers, redistributing work among the other servers as a function of a target time of completion for work running on the servers; and
- based on the threshold and the assessment of the capability of the other servers, assigning the service to the target server,
- wherein assessing the capacity of the target server includes calibrating the target server by subjecting the target server to a load of parallel threads and detecting central processing unit (CPU) consumption and random access memory (RAM) consumption that result from the load,
- wherein the threshold includes a maximum number of services and threads to be assigned.

4. The system of claim 3, further comprising registering servers having the same services to be run in parallel.

5. A computer program product embodied on a non-transitory computer readable medium, the computer program product including instructions that, when executed by a hardware computer, causes the hardware computer to perform operations for providing real-time load balancing and calibration processes, the operations comprising:
- receiving a request to execute a service;
- assessing capacity of a target server to execute the service;
- setting a threshold for a number of services to be executed on the target server;
- assigning a unique identifier of the service to the target server;
- assessing capability of other servers, and responsive to the assessment of the capability of the other servers, redistributing work among the other servers as a function of a target time of completion for work running on the servers; and
- based on the threshold and the assessment of the capability of the other servers, assigning the service to the target server,
- wherein assessing the capacity of the target server includes calibrating the target server by subjecting the target server to a load of parallel threads and detecting central processing unit (CPU) consumption and random access memory (RAM) consumption that result from the load,
- wherein the threshold includes a maximum number of services and threads to be assigned.

6. The computer program product of claim 5, wherein the operations further comprise registering servers having the same services to be run in parallel.

* * * * *